(12) United States Patent
Mehanna et al.

(10) Patent No.: US 10,002,329 B2
(45) Date of Patent: Jun. 19, 2018

(54) SELECTION AND MODIFICATION OF FEATURES USED BY ONE OR MORE MACHINE LEARNED MODELS USED BY AN ONLINE SYSTEM

(71) Applicant: Facebook, Inc., Menlo Park, CA (US)

(72) Inventors: Hussein Mohamed Hassan Mehanna, Cupertino, CA (US); Stuart Michael Bowers, Menlo Park, CA (US); Alexandre Defossez, London (GB); Parv Oberoi, Sunnyvale, CA (US); Ou Jin, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 552 days.

(21) Appl. No.: 14/498,898

(22) Filed: Sep. 26, 2014

(65) Prior Publication Data
US 2016/0092786 A1    Mar. 31, 2016

(51) Int. Cl.
*G06N 99/00* (2010.01)
(52) U.S. Cl.
CPC ................. *G06N 99/005* (2013.01)
(58) Field of Classification Search
CPC .................................................. G06N 99/005
USPC ..................................................... 706/12, 11
See application file for complete search history.

(56) References Cited

U.S. PATENT DOCUMENTS

| | | | | |
|---|---|---|---|---|
| 9,098,582 | B1* | 8/2015 | Bass | G06F 17/30864 |
| 2005/0049913 | A1* | 3/2005 | Huddleston | G06K 9/6228 |
| | | | | 706/13 |
| 2005/0125474 | A1* | 6/2005 | Pednault | G06F 17/18 |
| | | | | 708/400 |
| 2007/0214135 | A1* | 9/2007 | Crivat | G06F 17/30539 |
| 2013/0208977 | A1* | 8/2013 | Jia | G06K 9/6256 |
| | | | | 382/159 |

* cited by examiner

*Primary Examiner* — Lut Wong
(74) *Attorney, Agent, or Firm* — Fenwick & West LLP (57) ABSTRACT

An online system simplifies modification of features used by machine learned models used by the online system, such as machined learned models with high dimensionality. The online system obtains a superset of features including features used by at least one machine learned model and may include additional features. From the superset of features, the online system generates various groups of features for a machine learned model. The groups of features may be a group including features currently used by the machine learned model, a group including all available features, and one or more intermediate groups. Intermediate groups include various numbers of features from the set selected based on measures of feature impact on the machine learned model associated with various features. A user may select a group of features, test the machine learning model using the selected group, and then launch the tested model based on the results.

9 Claims, 3 Drawing Sheets

SELECTION AND MODIFICATION OF FEATURES USED BY ONE OR MORE MACHINE LEARNED MODELS USED BY AN ONLINE SYSTEM

BACKGROUND

This disclosure relates generally to online systems, and more specifically to modifying one or more machine learned models used by an online system.

An online system, such as a social networking system, allows its users to connect to and communicate with other online system users. Users may create profiles on an online system that are tied to their identities and include information about the users, such as interests and demographic information. The users may be individuals or entities such as corporations or charities. An online system receives content from various sources, such as users, and selects content items from the received content for presentation to the user. Interactions between the user and the selected content items are maintained by the online system and communicated to other online system users to facilitate interaction between users and the online system.

When selecting content items for presentation to a user, an online system may use one or more machine learned models that receive various features and select one or more content items based on the received features. For example, a machine learned model associates values with different types of user interactions with a content item and determines probabilities of a user performing different types of interactions based on information associated with the user by the online system, such as prior interactions performed by the user, and information associated with the content item. In this example, the machine learned model generates a value associated with the content item, and the online system determines whether to present the content item to the user based on the determined value.

An online system may use multiple machine learned models to select different types of content items for presentation to a user. Different machine learned models may be based on different features associated with the user or with content items. Because of the large number of features used by different machine learned models, modifying features used by one or more of the machine learned models or selecting features used by different machine learned models in conventional online systems is cumbersome and time-consuming.

SUMMARY

An online system applies one or more machine learned models to features associated with online system users or content items to generate one or more results. Based on the results, the online system selects content for presentation to a user or determines other information associated with a user or with a content item. Features used by a machine learned model may include attributes of a user retrieved from a user profile (e.g., demographic information), actions associated with the user, and connections between the user and other users. Additional examples of features may be characteristics of content items. In some embodiments, the online system applies multiple models that have overlapping features to generate results. For example, the online system applies a machine learned model to attributes of a user and characteristics of a content item to determine a result specifying a likelihood of the user indicating a preference for the content item, applies another machine learned model to the attributes of the user and the characteristics of the content item to determine a result specifying a likelihood of the user sharing the content item with another user, and applies one or more different machine learned models to the attributes of the user and the characteristics of the content item to determine results specifying likelihoods of the user performing different actions associated with the content item. As another example, the online system applies a machine learned model to information describing prior actions by a user with content items, demographic information associated with the user, connections between the user and an additional user associated with a content item, actions by the user with the additional user associated with the content item, characteristics of the content item, as well as any other additional information to determine the user's affinity for the content item. Based on the determined affinity, the online system determines whether to present the content item to the user. Different machine learned models may be applied to different types of content items or different types of users. Additionally, various machine learned models may be used to determine different information associated with a user, with a content item, or with another object maintained by the online system.

Machine learned models used by the online system may receive large numbers of features as inputs, and various machine learned models may use overlapping features to determine various information. The online system allows a user to modify or select features used by a machine learned model by identifying a superset of features based on data maintained by the online system. The superset of features includes features used by a machine learned model as well as new features which are not currently used by the machined learned model. New features in the superset may be features used by one or more additional machine learned models other than the machine learned model or may be features based on new types of data captured or generated by the online system. From the superset of features, the online system generates multiple groups of features. Each group includes different features from the superset. For example, different groups include different numbers of features or include different features. When generating the groups of features, the online system determines a measure of feature impact for the machine learned model associated with each feature in the set. A measure of feature impact associated with a feature provides a measure of the feature's importance to the machine learned model. In one embodiment, a measure of feature impact is proportional to the importance of the feature to the machine learned model, so features that are more important to the machine learned model (e.g., features resulting in a larger change to an error term of the machine learned model if removed from the machine learned model) are associated with higher measures of feature impact.

Based on the measures of feature impact associated with different features from the superset of features, the online system generates various groups of features. In one embodiment, the online system generates a group including each feature form the superset of features, a group including features already received by the machine learned model, and various intermediate groups each having different numbers of features from the set of features. An intermediate group may be associated with a threshold measure of feature impact, so features included in the intermediate group have a measure of feature impact equaling or exceeding the threshold measure of feature impact. Another intermediate group may be associated with a predetermined number of the features having a highest measure of feature impact.

Additionally, an intermediate group may include features used by an additional machine learned model that the online system concurrently uses with the machine learned model. Multiple intermediate groups of features, each associated with a different threshold measure of feature impact and/or a different number of highest measures of feature impact, may be generated.

Additional information may also be used to generate intermediate groups. For example, a measure of correlation between different features may be determined, and additional features having greater than a threshold measure of correlation to a feature in the set may be excluded from inclusion in a group including the feature. An intermediate group may include one or more additional features received by an additional machine learned model used by the online system concurrently with the machine learned model having at least a threshold measure of correlation to features currently received by the machine learned model and excludes the features received by the machine learned model having the threshold measure of correlation to the additional features. If the additional features used by the additional machine learned model have measures of feature impact differing from measures of feature impact for features of the machine learned model, computing resources may be conserved by reducing the number of features used by models that are concurrently applied without impairing results generated by the concurrently used models.

In one embodiment, information describing the groups of features is presented to the user that identifies one or more of the groups. When data associated with features in one or more of the identified groups is available, the online system notifies the user and applies the model to data associated with features in a group where data is available for each feature in the group. In various embodiments, the online system may notify the user when data is available for features included in individual identified groups or may notify the user with data is available for features in each of the identified groups. The online system applies the machine learned model to data associated with features included in each of the identified groups, when data associated with features in various groups is available, and provides the user with information describing performance of the machine learned model when applied to features associated with different identified groups. For example, the online system applies a machine learned model to data identified from a set of training data and associated with features included in an identified group. Based on the information describing performance of the machine learned model based on different identified groups, the user selects a group of features, and the online system applies the machine learned model to data maintained by the online system and associated with features included in the selected group.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
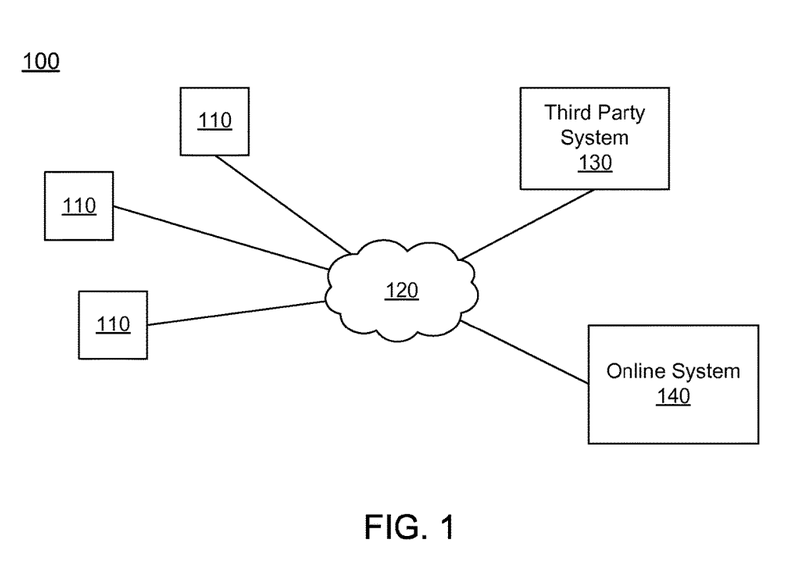
FIG. 1 is a block diagram of a system environment in which an online system operates, in accordance with an embodiment.

FIG. 1 is a block diagram of a system environment 100 for an online system 140, such as a social networking system. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
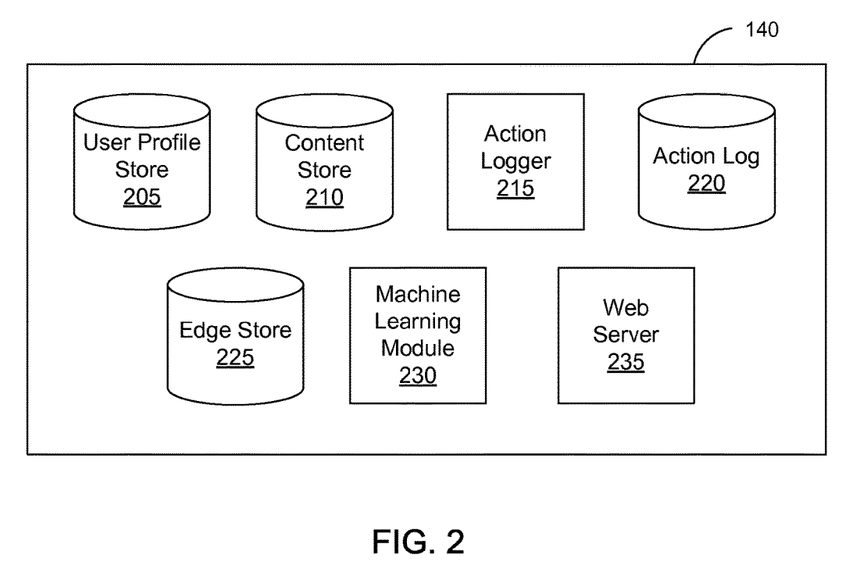
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a compensation module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate a user's interest in an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The machine learning module 230 applies one or more machine learned models to features associated with online system users to generate one or more results, which may be used to select content items for presentation to users or to determine other information associated with a user. Features used by a machine learned model may be attributes of a user retrieved from one or more of the user profile store 205 (e.g., demographic information), the action log 220 (e.g., actions associated with the user), and the edge store 225 (e.g., connections between the user and other users). Additional examples of features may be characteristics of content items retrieved from the content store 210 or received from a third-party system 130. For example, the machine learning module 230 applies a machine learned model to attributes of a user and characteristics of a content item to determine a result specifying a likelihood of the user indicating a preference for the content item, applies another machine learned model to the attributes of the user and the characteristics of the content item to determine a result specifying a likelihood of the user sharing the content item with another user, and applies one or more different machine learned models to the attributes of the user and the characteristics of the content item to determine results specifying likelihoods of the user performing different actions associated with the content item. As another example, the machine learning module 230 applies a machine learned model to information describing prior actions by a user with content items, demographic information associated with the user, connections between the user and an additional user associated with a content item, actions by the user with the additional user associated with the content item, characteristics of the content item, as well as any other additional information to determine the user's affinity for the content item. Based on the determined affinity, the online system 140 determines whether to present the content item to the user. Different machine learned models may be applied to different types of content items or different types of users. Additionally, various machine learned models may be used to determine different information associated with a user, with a content item, or with another object maintained by the online system 140

Machine learned models used by the machine learning module 230 may receive large numbers of features as inputs, and various machine learned models may use overlapping features to determine various information. The machine learning module 230 allows a user to modify or select features used by a machine learned model by identifying a superset of features based on data maintained by the online system. Modifying features used by a machine learned model may reduce the number of features used by the machine learned model or may reduce the number of different features used by concurrently applied machine learned models (e.g., by increasing the number of features used by a machine learned model and also used by another machine learned model) to increase computational efficiency when applying one or more machine learned models. The superset of features includes features used by a machine learned model as well as new features which are not currently used by the machined learned model. New features in the superset may be features used by one or more additional machine learned models other than the machine learned model or may be features based on new types of data captured or generated by the online system. From the superset of features, the machine learning module 230 generates multiple groups of features. Each group includes different features from the superset. For example, different groups include different numbers of features or include different features. When generating the groups of features, the machine learning module 230 determines a measure of feature impact for the machine learned model associated with each feature in the set. A measure of feature impact associated with a feature provides a measure of the feature's importance to the machine learned model. In one embodiment, a measure of feature impact is proportional to the importance of the feature to the machine learned model, so features that are more important to the machine learned model (e.g., features resulting in a larger change to an error term of the machine learned model if removed from the machine learned model) are associated with higher measures of feature impact.

Based on the measures of feature impact associated with different features from the superset of features, the machine learning module 230 generates various groups of features. In one embodiment, the online system generates a group including each feature form the superset of features, a group including features already received by the machine learned model, and various intermediate groups each having different numbers of features from the set of features. An intermediate group may be associated with a threshold measure of feature impact, so features included in the intermediate group have a measure of feature impact equaling or exceeding the threshold measure of feature impact. Another intermediate group may be associated with a predetermined number of the features having a highest measure of feature impact. Additionally, an intermediate group may include features used by an additional machine learned model that the online system concurrently uses with the machine learned model. Multiple intermediate groups of features, each associated with a different threshold measure of feature impact and/or a different number of highest measures of feature impact, may be generated.

Additional information may also be used by the machine learning module 230 to generate intermediate groups. For example, a measure of correlation between different features may be determined, and additional features having greater than a threshold measure of correlation to a feature in the set may be excluded from inclusion in a group including the feature. An intermediate group may include one or more additional features received by an additional machine learned model used by the online system concurrently with the machine learned model having at least a threshold measure of correlation to features currently received by the machine learned model and excludes the features received by the machine learned model having the threshold measure of correlation to the additional features. If the additional features used by the additional machine learned model have measures of feature impact differing from measures of feature impact for features of the machine learned model, computing resources may be conserved by reducing the number of features used by models that are concurrently applied without impairing results generated by the concurrently used models.

In one embodiment, information describing the groups of features is presented to a user that identifies one or more of the groups. The machine learning module 230 applies the machine learned model to data associated with features included in each of the identified groups and provides the user with information describing performance of the machine learned model when applied to features associated with different identified groups. For example, the machine learning module 230 applies a machine learned model to data identified from a set of training data and associated with features included in an identified group. Based on the information describing performance of the machine learned model based on different identified groups, the user selects a group of features. Subsequently, the machine learning module 230 the machine learned model to data maintained by the online system 140 and associated with features included in the selected group. Selection of features used by a machine learned model is further described below in conjunction with FIG. 3.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, WEBOS®, or BlackberryOS.

Figure 3:
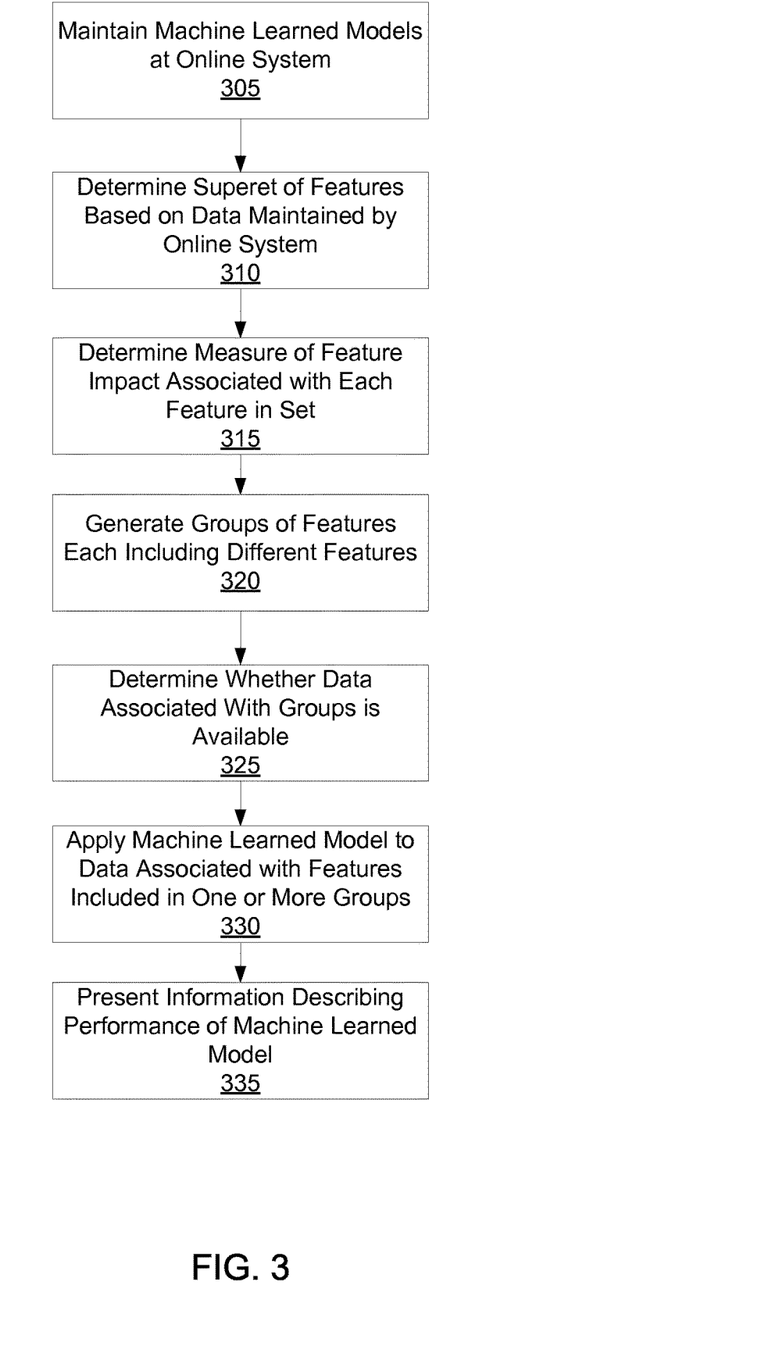
FIG. 3 is a flowchart of a method for determining features used by a machine learned model included in an online system, in accordance with an embodiment.

Determining Features for Use by a Machine Learned Model Used by the Online System FIG. 3 is a flowchart of one embodiment of a method for determining features used by a machine learned model included in an online system 140. In other embodiments, the method may include different and/or additional steps than those shown in FIG. 3. Additionally, steps of the method may be performed in different orders than the order described in conjunction with FIG. 3.

The online system 140 maintains 305 various machine learned models used to generate results associated with users, content items, or other objects maintained by the online system 140. As described above in conjunction with FIG. 2, a machine learned model receives various features as an input and generates a result based on data associated with the features. For example, features of the machine learned model are actions associated with a user, demographic information associated with the user, connections between the user and additional users, and demographic information associated with the additional users. In this example, the machine learned model generates a result based on data describing the actions associated with the user, data describing the demographic information associated with the user, data identifying connections between the user and the additional users, and data describing demographic information associated with the additional users.

Different machine learned models may be used to determine different results or to determine results for different types of users, for different types of content items, or for different types of objects. Each machine learned model may have a large number of features, so the online system 140 may expend significant computational resources obtaining the features used by various machine learned models and applying the machine learned models to various data. Additionally, various machine learned models may be run concurrently with each other and also have a high number of overlapping features, which may also expend significant computational resources of the online system 140 when the various machine learned models are applied to data maintained by the online system 140. To allow modification or configuration of features used by a machine learned model, the online system 140 determines 310 a superset of features for a machine learned model that includes a set of new features (i.e., features not currently received by the machine learned model) for the machine learned model as well as features currently received by the machine learned model based on data maintained by the online system 140. The machine learned model may be identified based on a user selection. For example, a user selects an identifier associated with the machine learned model or provides an identified associated with the machine learned model to the online system 140. Alternatively, the machine learned model is identified by the online system 140. For example, the superset of features includes each feature used by at least one machine learned model maintained 305 by the online system 140. The superset may also include additional features not currently used by machine learned models, such as new types of data captured or generated by the online system 140. In one embodiment, the determined superset identifies each feature used by at least one machine learned model maintained by the online system 305. Hence, in some embodiments, the superset includes each feature capable of being received by the machine learned model based on data maintained by the online system 140.

To modify features used by the machine learned model, which may conserve computational resources used to apply the machine learned model to data or may reduce a time taken by the machine learned model to generate a result, the online system 140 determines 315 a measure of feature impact to the identified machine learned model for each feature in the set of features. A measure of feature impact associated with a feature provides a measure of the feature's importance to the identified machine learned model. In one embodiment, a measure of feature impact is proportional to the importance of the feature to the identified machine learned model, so features that are more important to the machine learned model are associated with higher measures of feature impact. A measure of feature impact associated with a feature may be based on a contribution of the feature to an error term of the machine learned model. For example, a measure of feature impact for a feature is proportional to a change in the error term of the machine learned model if the feature is not included in the machine learned model, so the measure of feature impact for a feature is proportional to an amount of change in the error term of the machine learned model if the feature is removed from the machine learned model.

Based on the measures of feature impact associated with features from the set of features, the online system 140 generates 320 various groups each including different features from the set of features. For example, different groups include different numbers of features or include different features. In various embodiments, the online system 140 generates 320 a group including each feature form the set of features, a group including features originally received by the machine learned model, and one or more intermediate groups each having different numbers of features from the set of features. The online system 140 may associate an intermediate group with a threshold measure of feature impact, so the intermediate group includes features having measures of feature impact equaling or exceeding the threshold measure of feature impact but does not include features having measures of feature impact less than the threshold measure of feature impact. Alternatively, the online system 140 ranks features in the set of features based on their measure of feature impact and includes features having at least a threshold position in the ranking in an intermediate group. The online system may generate 320 various intermediate groups each associated with a different threshold measure of feature impact of with a different position in a ranking of features based on measure of feature impact, so different intermediate groups include features with feature impact scores equaling or exceeding the threshold measure of feature impact associated with the intermediate group or include features having at least the threshold position in the ranking of features associated with the intermediate group. Another group may be associated with a predetermined number of the features having a highest measure of feature impact or having the highest measures of feature impact.

Additional information may also be used when generating 320 the groups. For example, a measure of correlation between different features may be determined, and additional features having greater than a threshold measure of correlation to a feature in the set may be excluded from inclusion in a group including the feature. A group may include one or more additional features received by an additional machine learned model that is used by the online system concurrently with the machine learned model and that have at least a threshold measure of correlation to features currently received by the machine learned model. The features currently received from the machine learned model having at least the threshold measure of similarity to the additional models are excluded from the group. Measures of feature impact may also be used with the measures of correlation, so that the additional features are included in the group instead of the features currently received by the machine learned model if the additional features have at least a threshold measure of correlation to a feature currently received by the machine learned model and the additional features have measures of feature impact that differ from measures of feature impact for the features currently received by the machine learned model by less than a threshold amount. This may allow the online system 140 to conserve computing resources by leveraging features already obtained for a different machine learned model, reducing the amount of data to be retrieved and processed when applying the machine learned model and the additional machine learned model, without impairing results generated by the machine learned model.

The online system 140 determines 325 whether data associated with features included in each group of features is available for use by the machine learned model. For example, the online system 140 determines 325 whether at least a threshold amount of data associated with features in a group is maintained by the online system, and determines 325 the data associated with the features in the group is available for use when at least the threshold amount of data is associated with features in the group. In one embodiment, the online system 140 receives a selection of one or more groups from a user and determines 325 whether data associated with the selected one or more groups is available for use by the machine learned model. For example, the online system 140 determines 325 whether a training set of data includes at least a threshold amount of data associate with features in the selected one or more groups, allowing the online system 140 obtain a sufficient amount of data for evaluating functionality of the machine learned model using features from the one or more groups before applying the machine learned model using the features in the group to the training set of data. In various embodiments, the training set of data is obtained during operation of the online system 140, allowing the different groups of features to be evaluated based on data currently used or obtained by the online system 140. In some embodiments, the online system 140 determines 325 when data associated with features in various groups is available and indicate to a user when data associated with individual groups is available. Alternatively, the online system 140 determines whether various features in a group are within a threshold amount of a value associated with a feature in the group and determines 325 data associated with the group is available when at least a threshold number of features in the group are associated with data within the threshold amount of values associated with the features.

After determining 325 data associated with features included in each group of features is available for use by the machine learned model, the online system 140 applies 330 the machine learned model to the data associated with features in various groups. For example, the online system 140 applies 330 the machine learned model to data associated with features in a group and determines a result based on the features in the group and applies 330 the machine learned model to data associated with features in an additional group to determine a result based on the features in the additional groups. The machine learned model may be applied 330 to data associated with each group of features or may be applied 330 to data associated with groups of features selected by a user.

Information describing performance of the machine learned model when applied to data associated with one or more of the groups of features is presented 335 to a user, allowing the user to evaluate performance of the machine learned model when data associated with different groups of features is used. In one embodiment, the presented information is a performance metric associated with a group of features based on a result obtained by the machine learned model when applied to data associated with the group of features. Performance metrics based on data associated with different groups of features may be presented, allowing the user to evaluate differences between results based on different groups of features. For example, a performance metric for a group represents a difference between the result from the machine learned model using the features in the group and a result from the model using the features originally received by the machine learned model. A result generated from applying the machine learned model to data associated with its original features may also be presented 335, allowing the user to determine differences between the results determined by the model based on data associated with its original features and data associated with features from one or more groups.

In some embodiments, the online system 140 may also present 335 measures of feature impact associated with features from a group on the machine learned model applied to data associated with features in the group. Presenting 335 measures of feature impact associated with features in a group may provide a user with information describing the contribution of various features in the group to the result generated by the machine learned model from applying the machine learned model to data associated with features in the group. Such information may allow the user to make a more informed selection of a group. In some embodiments, the user may modify the features included in a group, so the measures of feature impact associated with features in the group allows the user to more accurately identify features to remove from the group while minimizing error to the generated result from the removed features.

Based on the presented information, the user selects a group of features for use by the machine learned model, and the online system 140 subsequently uses the features in the group of features when applying the machine learned model to data maintained by the online system 140. Hence, the online system 140 allows the user to evaluate various groups of features for use by the machine learned model. Generating groups including different features allows the online system 140 to expedite modification of features used by the machine learned model.

Figure 4:
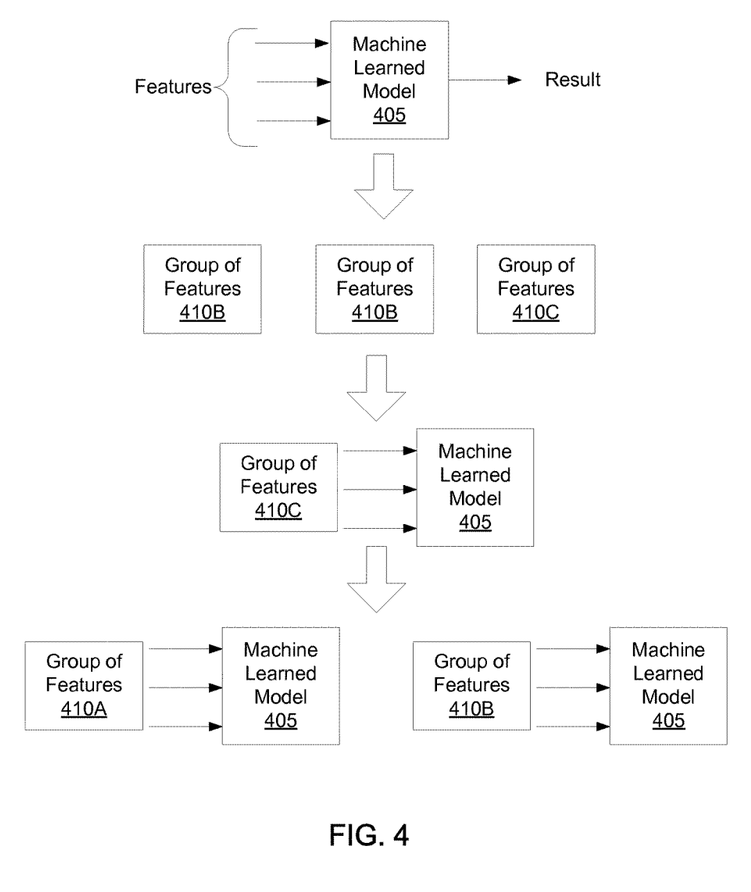
FIG. 4 is a process flow diagram of a method for modifying features used by a machine learned model, in accordance with an embodiment.

FIG. 4 shows a process flow diagram of one embodiment of a method for modifying features used by a machine learned model. In the example of FIG. 4, a machine learned model 405 is identified. The machine learned model 405 may be identified from multiple machine learned models stored by an online system 140 or may be a newly created machine learned model 405. As described above in conjunction with FIGS. 2 and 3, the machine learned model 405 receives various features as inputs and generates a result based on data associated with the features.

To modify the features used by the machine learned model 405, the online system 140 generates various groups of features 410A, 410B, 410C (individually and collectively referred to using reference number 410) based on data maintained by the online system 140. For example, the machine learned model 405 is a model for predicting a likelihood of a user performing a specific type of action, and the groups of features 410 are determined based on information associated with a user by the online system 140, such as demographic information, prior actions performed by the user, characteristics of content items with which the user previously interacted, or other suitable information. In various embodiments, the online system 140 generates the groups of features 410A, 410B, 410C based on features used by other machine learned models maintained by the online system 140, such as machine learned models for determining likelihoods of the user performing other types of actions. As described above in conjunction with FIGS. 2 and 3, the online system 140 determines a superset of features based on information maintained by the online system 140, determines measures of feature impact on the machine learned model 405 for each feature in the superset (or for a set of features within the superset), and generates the groups of features 410A, 410B, 410C based on the measures of feature impact associated with different features. For example, each group of features 410A, 410B, 410C is associated with a different threshold measure of feature impact, so each group of features 410A, 410B, 410C includes features having at least the associated threshold measure of feature impact. For example, group of features 410A is associated with a low threshold measure of feature impact, so it includes 600 features; group of features 410C is associated with a high threshold measure of feature impact, so it includes 200 features, while group of features 410B is associated with an intermediate measure of feature impact and includes 400 features.

In the example of FIG. 4, each group of features 410A, 410B, 410C is selected, so the online system 140 applies the machine learned model 405 to data associated with features included in each group of features 410 to evaluate performance of the machine learned model 405 when the different groups of features 410 are used as inputs to the machine learned model 405. As described above in conjunction with FIGS. 2 and 3, the online system 140 may notify a user when data associated with each feature in a group of features 410 is available, or may apply the model to data associated with features in a group of features 410 when data associated with each feature in the group of features 410 is available. In the example of FIG. 4, data associated with each feature in the group of features 410C is available before data associated with each feature in groups of features 410A, 410B is available. Hence, the online system 140 applies the machine learned model 405 to data associated with features in group of features 410C, then applies the machine learned model 405 to data associated with features in groups of features 410A, 410B after data associated with each feature in groups of features 410A, 410B is available. The data to which the machine learned model 405 is applied may be retrieved from a training set of data that the online system 140 identifies from data maintained by the online system 140.

As described above in conjunction with FIG. 3, a user is then presented with information describing the performance of the machine learned model 405 when applied to data associated with features in different groups of features 410. This allows the user to determine whether the result generated by the machine learned model 405 when applied to data associated with features in a group of features 410 provides a result suitable for use by the online system. For example, the online system 140 identifies a result from the machine learned model 405 when applied to data from a training set associated with the features originally received as inputs by the machine learned model 405 and identifies results generated when the machine learned model 405 is applied to data from the training set associated with features included in group of features 410A, included in group of features 410B, and included in group of features 410C. Based on the presented information, the user selects a group of features 410, and subsequent application of the machine learned model 405 by the online system 140 is to data associated with features in the selected group of features 410.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   maintaining a model at an online system, the model receiving a plurality of features and generating a response based on the received features;
   determining a set of new features available for the model based on data maintained by the online system;
   determining a superset of features for the model, the superset of features comprising the plurality of features used by the model and the new features available for the model;
   determining measures of feature impact for the features in the superset of features, a measure of feature impact for a feature corresponding to a contribution of the feature to an error term of the model proportional to a change in the error term when the feature is removed from the model;
   generating a first group of features from the determined superset of features for the model, each feature in the first group of features having a measure of feature impact at least exceeding a first measure of feature impact threshold;
   generating an additional group of features from the determined superset of features, each feature in the additional group of features having a measure of feature impact at least exceeding a second measure of feature impact threshold that is different relative to the first measure of feature impact threshold, the additional group of features including the first group of features and an additional set of features in addition to the first group of features;
   training a first version of the model using the first group of features and a second version of the model using the additional group of features, each group of features resulting in a performance metric for the model; and
   presenting, for display in a user interface, information describing the performance metric for each version of the model.

2. The method of claim 1, wherein generating at least one of the first group of features or the additional group of features from the set of new features based at least in part on the determined measures of feature impact comprises:
   generating a group including one or more features received by an additional model, the additional model used concurrently with the model by the online system.

3. The method of claim 1, wherein the first group and the additional group each include a different predetermined number of the features having a highest measure of feature impact.

4. The method of claim 1, wherein generating the first group and the additional group from the new set of features based at least in part on the determined measures of feature impact comprises:
   identifying a predetermined number of features having highest measures of feature impact; and
   generating a group including the identified predetermined number of features.

5. The method of claim 1, wherein generating the first group and the additional group from the new set of features based at least in part on the determined measures of feature impact comprises:
   generating the first group by including each of the features in the superset of features that are received by the model; and
   generating the additional group by including the plurality of features received by the model and at least one new feature from the set of new features available for the model.

6. The method of claim 1, further comprising:
   receiving a selection of a group of features from the first group of features and the additional group of features; and
   updating the model to use the selected group of features.

7. A computer program product comprising a non-transitory computer-readable storage medium having instructions encoded thereon that, when executed by a processor, cause the processor to:

maintain a model at an online system, the model receiving a plurality of features and generating a response based on the received features;

determine a set of new features available for the model based on data maintained by the online system;

determine a superset of features for the model, the superset of features comprising the plurality of features used by the model and the new features available for the model;

determine measures of feature impact for the features in the superset of features, a measure of feature impact for a feature corresponding to a contribution of the feature to an error term of the model proportional to a change in the error term when the feature is removed from the model;

generate a first group of features from the determined superset of features for the model, each feature in the first group of features having a measure of feature impact at least exceeding a first measure of feature impact threshold;

generate an additional group of features from the determined superset of features, each feature in the additional group of features having a measure of feature impact at least exceeding a second measure of feature impact threshold that is different relative to the first measure of feature impact threshold, the additional group of features including the first group of features and an additional set of features in addition to the first group of features;

train a first version of the model using the first group of features and a second version of the model using the additional group of features, each group of features resulting in a performance metric for the model; and present, for display in a user interface, information describing the performance metric for each version of the model.

8. The computer program product of claim 7, wherein generating at least one of the first group of features or the additional group of features from the set of new features based at least in part on the determined measures of feature impact comprises:

generating a group including one or more features received by an additional model, the additional model used concurrently with the model by the online system.

9. A method comprising:

maintaining a plurality of models at an online system, each model receiving a plurality of features and generating a response based on the received features;

determining a set of new features available for a model from the plurality of models based on data maintained by the online system;

determining a superset of features for the model, the superset of features comprising the plurality of features used by the model and the new features available for the model;

determining measures of feature impact for the features in the superset of features, a measure of feature impact for a feature corresponding to a contribution of the feature to an error term of the model that is proportional to a change in the error term upon the feature removal of the feature from the model;

determining measures of correlation between one or more of the features in the superset and one or more additional features in the superset, the one or more additional features used by an additional model from the plurality of models that concurrently used with the model by the online system;

generating a first group of features from the determined superset of features for the model based at least in part on the determined measures of feature impact and the determined measures of correlation, each feature in the first group of features having a measure of feature impact at least exceeding a first measure of feature impact threshold and excluding features having at least a threshold measure of correlation to another feature in the first group of features;

generating an additional group of features from the determined superset of features based at least in part on the determined measures of feature impact and the determined measures of correlation, each feature in the additional group of features having a measure of feature impact at least exceeding a second measure of feature impact threshold that is different relative to the first measure of feature impact threshold and excluding features having at least the threshold measure of correlation to another feature in the additional group of features, the additional group of features including the first group of features and an additional set of features in addition to the first group of features;

training a first version of the model using the first group of features and a second version of the model using the additional group of features, each group of features resulting in a performance metric for the model; and presenting, for display in a user interface, information describing the performance metric for each version of the model.

* * * * *